(12) United States Patent
Weitz

(10) Patent No.: US 9,087,552 B2
(45) Date of Patent: *Jul. 21, 2015

(54) AUDIO AND MUSIC DATA TRANSMISSION MEDIUM AND TRANSMISSION PROTOCOL

(71) Applicant: Avid Technology, Inc., Burlington, MA (US)

(72) Inventor: John C. Weitz, Belmont, CA (US)

(73) Assignee: Avid Technology, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/262,886

(22) Filed: Apr. 28, 2014

(65) Prior Publication Data

US 2014/0244014 A1 Aug. 28, 2014

Related U.S. Application Data

(63) Continuation of application No. 10/342,963, filed on Jan. 15, 2003, now Pat. No. 8,712,562.

(51) Int. Cl.
*G06F 17/00* (2006.01)
*G11B 20/10* (2006.01)
*H04H 60/04* (2008.01)

(52) U.S. Cl.
CPC ......... *G11B 20/10527* (2013.01); *H04H 60/04* (2013.01)

(58) Field of Classification Search
CPC ... G06F 11/221; G06F 13/4059; G06K 19/07; G06K 19/0723; H04H 60/04
See application file for complete search history.

(56) References Cited

U.S. PATENT DOCUMENTS

| | | | |
|---|---|---|---|
| 5,577,044 A | 11/1996 | Oxford |
| 6,189,127 B1 | 2/2001 | Fang et al. |
| 6,606,678 B1 | 8/2003 | Nakamura |
| 7,017,810 B2 | 3/2006 | Bando |
| 8,712,562 B1 | 4/2014 | Weitz |

FOREIGN PATENT DOCUMENTS

WO WO 0248849 6/2002

*Primary Examiner* — Andrew C Flanders
(74) *Attorney, Agent, or Firm* — Oliver Strimpel

(57) ABSTRACT

A transmission medium and protocol is provided for bi-directional communication between an audio system and a peripheral device. The transmission medium includes a communication medium for communicating data and a communication medium for communicating a clock signal that corresponds to a transmission rate of bits on the other communication media. By transmitting the clock signal on a separate communication medium from the data, clock recovery is avoided. There may be multiple clock domains. By having multiple clock domains, multiple sample rates can be supported. Synchronization information is embedded in the signal by using run length limiting markers between the data for each channel and a synchronization word having more consecutive zero bits than the number of bits for each channel. One or more channels may be dedicated to providing control and status information.

21 Claims, 2 Drawing Sheets

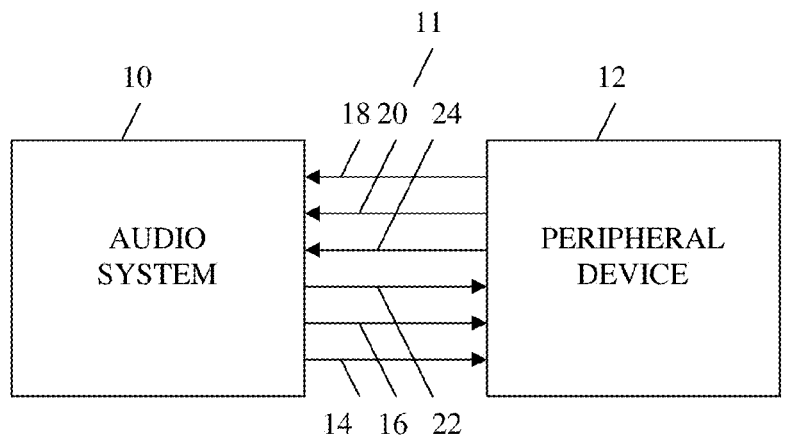
FIG. 1
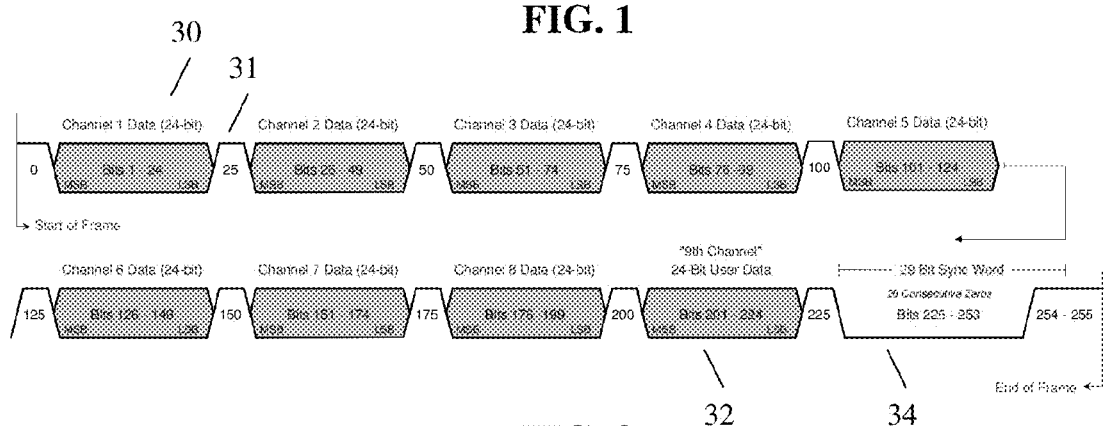
FIG. 2
| MSB | 24-Bit 9th Channel Bit Definitions | LSB |
|---|---|---|
| Address | | 8-Bit Data |
| 23..8 | | 7..0 |
FIG. 3
| MSB | 24-Bit 9th Channel Bit Definitions | | LSB |
|---|---|---|---|
| R/W | 7-Bit Device ID | 8-Bit Reg. Address | 8-Bit Data |
| 23 | 22..16 | 15..8 | 7..0 |
FIG. 4

AUDIO AND MUSIC DATA TRANSMISSION MEDIUM AND TRANSMISSION PROTOCOL

CROSS REFERENCE TO RELATED APPLICATION

This application claims priority to and the benefit of, under 35 U.S.C. §120, and is a continuing application of U.S. application Ser. No. 10/342,963, filed Jan. 15, 2003, which is incorporated herein by reference.

BACKGROUND

There are several existing transmission media and transmission protocols for transferring audio and music data between processing devices. Examples includes the Kurzweil KDS audio interface, the Audio and Music Data Transmission Protocol for transmitting data over a IEEE-1394 standard serial bus, also called mLAN, the ADAT optical interface from Alesis, and the Sample Multiplexing (S/MUX) protocol from Sonorus. For example, an audio system, such as a digital audio workstation, may be connected using such transmission media and protocols to a peripheral device that processes audio data in a manner specified by the audio system.

Generally, transmission media and transmission protocols for communicating between audio systems and peripheral devices seek to solve problem such as reliability, channel density, multiple high sample rates, dual time domains, long cable distances, low latency communication, synchronous operation and real-time communication, all while maintaining low costs.

SUMMARY

A transmission medium and protocol is provided for bi-directional communication between an audio system and a peripheral device. A transmission medium is a physical layer for communication of audio data and control information between the audio system and the peripheral device according to a protocol. The peripheral device processes audio data in a manner specified by the audio system.

The transmission medium includes a communication medium for communicating data and a communication medium for communicating a clock signal that corresponds to a transmission rate of bits on the other communication media. By transmitting the clock signal on a separate communication medium from the data, clock recovery is avoided. A twisted pair may be used as the communication medium, over which signals are sent as low voltage differential signals.

In each clock domain, there are one or more twisted pairs for communicating data in one direction, one twisted pair for communicating a corresponding clock signal in that direction, one or more twisted pairs for communicating data in another direction, and another twisted pair for communicating a corresponding clock signal in that other direction. There may be multiple clock domains. By having multiple clock domains, multiple sample rates can be supported.

Data that corresponds to a period of time, also called a frame, may be sent in multiple channels over the transmission medium. Synchronization information corresponding to each frame is embedded in the signal by using run length limiting markers between the data for each channel and a synchronization word having more consecutive zero bits than the number of bits for each channel. One or more channels on a twisted pair may be dedicated to providing control and status information.

An audio system allows a user to specify processing operations to be performed on audio data, and transmits the audio data with control information to a peripheral device to instruct the peripheral device to perform the specified operation on the transmitted audio data.

The audio system thus includes an output interface for accessing the communication medium on which data is transmitted to the peripheral device as a low voltage differential signal. The output interface also accesses the communication medium on which a clock signal is transmitted which corresponds to a transmission rate of bits on the other communication medium.

The audio system also sends requests for status information to the peripheral device over one or more channels on the communication medium. It also sends control information to control the processing performed by the peripheral device, for example to set parameters for operations performed by processing devices in the peripheral device.

The audio system also may have an input interface for accessing a communication medium on which data is transmitted by the peripheral device to the audio system as a low voltage differential signal. Another communication medium is used by the peripheral device to receive a clock signal that corresponds to a transmission rate of bits on the other communication medium. The input interface also may process status information and reply information received from the peripheral device.

A peripheral device for communication with the audio system thus includes one or more processing modules for performing operations on audio data. One or more registers store status information of one or more of the processing modules in the device. One or more registers store control information for one or more of the processing modules in the device.

The peripheral device also includes an input interface for accessing the communication medium on which data is received from the audio system as a low voltage differential signal. The input interface also accesses another communication medium on which a clock signal is transmitted which corresponds to a transmission rate of bits on the other communication medium. The peripheral device processes the clock signal received by the input interface to extract data transmitted on the other communication medium.

The peripheral device also processes requests for status information received by the input interface from the audio system over one or more channels on the communication medium to access the plurality of registers. It also processes control information received by the input interface from the audio system over one or more channels on the communication medium to access the plurality of registers. The peripheral device also processes digital audio data received by the input interface over one or more channels on the communication medium according to the clock signal and directs the received digital audio data to one or more processing modules.

The peripheral device also may have an output interface for accessing a communication medium on which data is transmitted to the audio system as a low voltage differential signal. A communication medium also is used by the peripheral device to transmit a clock signal that corresponds to a transmission rate of bits on the other communication medium. The peripheral device also may provide, in response to requests for status information, reply information to the output interface for transmission to the audio system over one or more channels on the communication medium. The peripheral device also provides, in response to control information from the audio system, reply information to the output interface for transmission to the audio system over one or more channels on the communication medium.

The peripheral device also may provide digital audio data to its output interface for transmission to the audio system over a plurality of channels on the communication medium.

The audio data, requests for status information and control information may be sent in a plurality of channels on the communication medium. The status and control information is provided in a designated one of the plurality of channels. Synchronization information is embedded in the signal by using run length limiting markers between the data for each channel and a synchronization word having more consecutive zero bits than the number of bits in each channel. The synchronization information is generated in response to a clock generation circuit on the peripheral device. The peripheral device provide the synchronization information to the audio system. The audio system in turn synchronizes to the peripheral device and send data to the peripheral device according to the received synchronization information.

BRIEF DESCRIPTION OF THE DRAWINGS

FIG. 1 is block diagram of a system including an audio system and a peripheral device that communicate over a transmission medium.

FIG. 2 is a timing diagram for explaining the format of data transmitted over the transmission medium.

FIG. 3 is a description of the channel control word illustrated in FIG. 2.

FIG. 4 is a description of the address field illustrated in FIG. 3.

DETAILED DESCRIPTION

Figure 5:
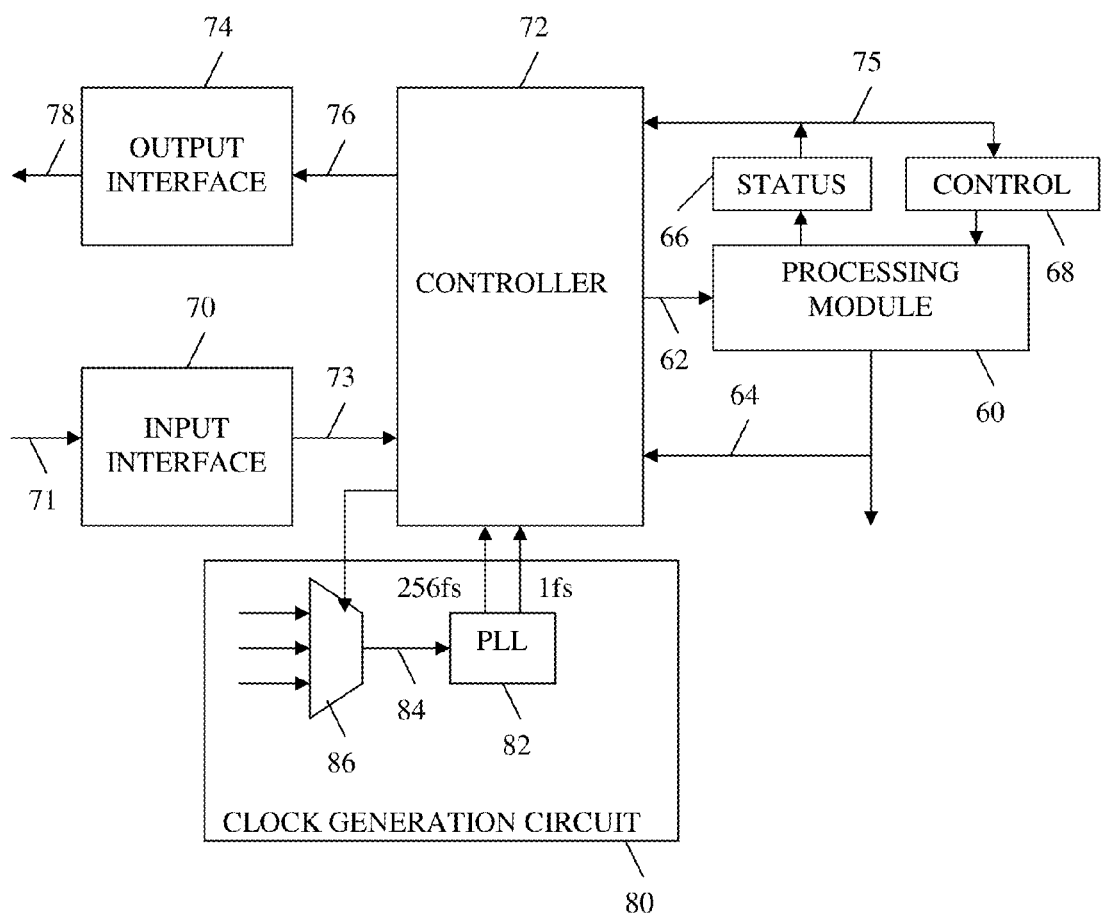
FIG. 5 is a more detailed description of a peripheral device of FIG. 1.

Referring now to FIG. 1, an audio system 10 and a peripheral device 12 are connected using a transmission medium 11 that permits bi-directional communication. The audio system allows a user to specify processing operations to be performed on audio data, and transmits the audio data with control information to a peripheral device to instruct the peripheral device to perform the specified operation on the transmitted audio data. The peripheral device processes audio data in a manner specified by the audio system. A transmission medium is a physical layer for communication of data between devices. In one embodiment, the transmission medium includes a first communication medium and a second communication medium for communicating data. A third communication medium transmits a clock signal that corresponds to a transmission rate of bits on the first and second communication media.

In one embodiment, a twisted pair is used as the communication medium, over which signals are sent as low voltage differential signals. In each clock domain, there are one or more twisted pairs (14,16 in one direction, 18, 20 in another direction) for communicating data, and one twisted pair (22 in one direction, 24 in another direction) for communicating the clock signal. By transmitting clock on a separate twisted pair from the data, clock data recovery is avoided. There may be multiple clock domains. By having multiple clock domains, multiple sample rates can be supported.

Referring to FIG. 2, how data is encoded on the transmission medium as a low voltage differential signal will now be described. The data is formatted into frames, each comprising eight channels (30) of 24-bit audio data, separated by a marker bit (31), followed by a ninth channel (32) for 24-bits of user data. The user data may be, for example, control information and status requests for configuration and control, device identification, status, metering, midi data and C-Bit emulation for controlling peripherals. The ninth channel may be dedicated to providing solely such user information.

The signals for the plurality of channels for each period of time (one frame) also include a synchronization signal (34), shown in FIG. 2 at the end of the frame. The synchronization signal is used to maintain sample synchronization and is denoted as a 29-bit synchronization word, with 28 consecutive zeros followed by a one. The marker bit (31) ensures that a run of zeros in the data never is longer than 24 bits. Thus, if a run of zeros longer than 24 bits is detected, then the synchronization word (34) is detected. By embedding synchronization information in the data in this manner, a separate communication path for synchronization information is avoided.

Referring to FIG. 3, an example format of the ninth channel control word includes a 16-bit address field 40 in the most significant bits and an 8-bit data field 42 in the least significant bits. An example format for the address field 40 is shown in more detail in FIG. 4. It includes a read/write control bit (50) as the most significant bit (where a logical 1 designates write and a logical 0 designates read). The next most significant 7-bits (52) may represent a unique device identifier that may indicate, for example, a device type or a specific device. The next eight bits (54) may designate an address of a register to be accessed in the peripheral device in the register address space of the peripheral device.

Using the transmission medium and protocol as described above, a 32-channel cable with 4 control channels can be provided in each direction using six twisted pairs in each direction, for a total of twelve twisted pairs. One clock domain uses three twisted pairs in each direction, for a total of six twisted pairs. One clock domain may transmit data using one sample rate, whereas the other clock domain may transmit data using a different sample rate. All of the channels may be provided to a single peripheral device. Each control channel also may be dedicated to a particular function, such as housekeeping functions.

A messaging protocol that may be supported using this transmission medium and protocol is a request/reply protocol, where only the audio system, not peripheral devices, initiate communication. A peripheral device interprets a read/write command on the control channel and responds on the next sample by echoing back the interpreted write command unaltered, or echoing back the interpreted read command with the contents of the addressed register in the data field. An absence of a response may be interpreted by the audio device as resulting from an invalid command or that the device is unavailable. One command may be designated as a null command, so that a peripheral device does not potentially issue a response in every frame to a possible command from the audio system. This null command, for example, may be "000000h".

Referring now to FIG. 5, a peripheral device for communication with the audio system includes one or more processing modules 60 for performing operations on input audio data 62 to produce output audio data 64. One or more registers 66 store status information of one or more of the processing modules in the device. One or more registers store control information 68 for one or more of the processing modules in the device. The peripheral device also includes an input interface 70 for accessing the transmission medium 71 on which data is received from the audio system as a low voltage differential signal. The input interface processes the clock signal to extract transmitted data and provide the data 73. A controller 72 within the peripheral device directs the audio data 62 taken from the received data 73 to the processing module, or to a selected processing module if there is more than one. With more than one processing module, a crosspoint switch (not shown) may be provided in the peripheral device. The state of the crosspoint switch also may be controlled using the control channel to allow the audio system to select which processing module should be used.

The controller 72 also processes requests for status or control information in the data 73 to access the plurality of status or control registers of the processing module via connection 75. The processing module may be, for example, a switch or router or a device that modifies the audio data. The controller provides information 76 to the output interface to permit replies to be includes in data sent to the audio system over transmission medium 78. The peripheral device also may provide digital audio data to its output interface for transmission to the audio system over a plurality of channels on the fourth and fifth communication media.

A clock generator 80 also is provided on the peripheral device. The clock generator includes a phase locked loop 82 that locks to a reference source 84. The reference source 84 may be selected from a number of different sources, such as an internal clock generation circuit, or other signals that may be received from other devices, by using selector 86. The settings of the clock generation circuit, such as the selection of the reference source 84, also may be defined by control and status information sent over the ninth channel. The phase locked loop 82 provides a first clock signal that is at a rate of 256 times a selected frequency (256 fs) and a second clock signal at the selected frequency (1 fs). The higher frequency clock signal is provided to the output interface for the clock signal transmitted over the communication medium. The other clock signal is used to generate the synchronization signal. The peripheral device thus provides the synchronization information to the audio system. The audio system in turn sends to the peripheral device data with an embedded synchronization signal at the designated clock rate. The audio system also synchronizes its operations to the synchronization signal.

The audio system that may use such a peripheral device thus includes an output interface for accessing the communication medium on which data is transmitted to the peripheral device. The output interface also accesses a communication medium on which a clock signal is transmitted which corresponds to a transmission rate of bits on the other communication medium. The audio system also sends requests for status information to the peripheral device over one or more channels on the communication medium. It also sends control information to control the processing performed by the peripheral device, for example to set parameters for operations performed by processing devices in the peripheral device. The audio system also may have an input interface for accessing a communication medium on which data is transmitted by the peripheral device to the audio system. A communication medium carries a clock signal that is transmitted by the peripheral device and that corresponds to a transmission rate of bits on the other communication medium. The input interface also may process status information and reply information received from the peripheral device.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A peripheral device for communication with an audio system, comprising:

one or more processing modules for performing operations with respect to audio data;

an input interface having inputs for receiving signals from an input transmission medium comprising a first communication medium and a second communication medium on which data is received from the audio system as a low voltage differential signal, and from a third communication medium on which a first clock signal is transmitted which corresponds to a transmission rate of bits of the data received on the first and second communication media;

wherein the data received on the first and second communication medium as a low voltage differential signal defines a plurality of frames of input channels of audio and user data in a sequence over time, wherein each frame of the data corresponds to a period of time and comprises a plurality of channels of audio data and a channel of user data and terminated by a synchronization signal with a run length delimiter before each of the plurality of channels and before the synchronization signal, wherein the channel of user data carries requests for status information and control information, wherein each of the plurality of channels of audio data in the frame carries a plurality of bits of a different one of the input channels of audio data for the period of time of the frame, and wherein the synchronization signal comprises a run of zeros greater than a number of bits in each channel;

the input interface processing the first clock signal received over the third communication medium to extract the data received on the first and second communication medium, the extracted data being output to a controller;

the controller having an input receiving, from the input interface, the extracted data and processing digital audio data in the extracted data received from the input interface and directing the received digital audio data from the frame to the one or more processing modules for processing;

an output interface having outputs for connection to an output transmission medium comprising a fourth communication medium and a fifth communication medium, on which data is transmitted to the audio system as a low voltage differential signal, and a sixth communication medium, on which a second clock signal is transmitted which corresponds to a transmission rate of bits of the data transmitted on the fourth and fifth communication media;

wherein the data transmitted on the fourth and fifth communication medium as a low voltage differential signal defines a plurality of frames of output channels of audio and user data in sequence over time, wherein each frame of the data corresponds to a period of time and comprises a plurality of channels of audio data and a channel of user data, terminated by a synchronization signal, with a run length delimiter between the data of each channel and the synchronization signal, wherein the channel of user data carries reply information, wherein each of the plurality of channels of audio data in the frame carries a plurality of bits of a different one of the output channels of audio data for the period of time of the frame, and wherein the synchronization signal comprises a run of zeros greater than a number of bits in each channel the controller providing, in response to operations to be performed on input digital audio data in one frame received by the input interface, output digital audio data from the one or more processing modules to the output interface for transmission in a subsequent frame output by the output interface to the audio system over the output transmission medium;

wherein the input transmission medium further comprises, and the input interface further has inputs to receive signals from, a seventh communication medium and a eighth communication medium on which data is received from the audio system as a low voltage differential signal, and for accessing a ninth communication medium on which a third clock signal is transmitted which corresponds to a transmission rate of bits of the data received on the seventh and eighth communication media;

wherein the output transmission medium further comprises, and the output interface further has outputs for connection to, a tenth communication medium and an eleventh communication medium on which data is transmitted to the audio system as a low voltage differential signal, and for accessing a twelfth communication medium on which a fourth clock signal is transmitted which corresponds to a transmission rate of bits of the data transmitted on the tenth and eleventh communication media;

wherein the first and second clock signals have a first clock rate and the third and fourth clock signals have a second clock rate different from the first clock rate.

2. The peripheral device of claim 1, further comprising:
a clock generation circuit having an output providing the second clock signal for transmission on the sixth communication medium, and wherein the first clock signal received on the third communication medium and the second clock signal have a same first clock rate;

wherein the clock generation circuit further has an output for providing a synchronization clock signal having a rate related to the second clock signal, by a number of bits in each frame, for generating the synchronization signal for each frame output by the output interface.

3. The peripheral device of claim 2, wherein the clock generation circuit has a setting controlled by the controller in response to control information provided by the audio system through the input interface to set the first clock rate.

4. The peripheral device of claim 3, wherein the audio system is connected to the peripheral device through the input transmission medium and the output transmission medium, wherein the audio system receives the synchronization signal from the output transmission medium and synchronizes to the peripheral device by sending frames of data with a corresponding synchronization signal to the peripheral device on the input transmission medium.

5. The peripheral device of claim 1, wherein the audio system is connected to the peripheral device through the input transmission medium and the output transmission medium, wherein the audio system receives the synchronization signal from the output transmission medium and synchronizes to the peripheral device by sending frames of data with a corresponding synchronization signal to the peripheral device on the input transmission medium.

6. The peripheral device of claim 1, wherein the one or more processing modules comprises a plurality of processing modules connected to the controller by a switch.

7. The peripheral device of claim 6, wherein a state of a switch is controlled using data received in the user data channel over the input transmission medium.

8. The peripheral device of claim 1, wherein a messaging protocol between the audio system and the peripheral device includes a request and reply wherein requests are initiated only by the audio system.

9. The peripheral device of claim 8, wherein the peripheral device processes a request for status information by echoing back the request with contents from one or more registers of status information, and the peripheral device processes a request to set control information by echoing back the request as an acknowledgement.

10. The peripheral device of claim 9, wherein the messaging protocol further includes a null command in response to which the peripheral device does not issue a response.

11. The peripheral device of claim 1,
wherein the controller receives the second clock signal for transmission on the sixth communication medium, and wherein the first clock signal received on the third communication medium and the second clock signal have a same first clock rate;

wherein the controller has an input to receive a synchronization clock signal having a rate related to the second clock signal, by a number of bits in each frame, and an output to provides the synchronization signal for each frame output by the output interface;

wherein the audio system connects to the peripheral device through the input transmission medium and the output transmission medium, wherein the audio system receives the synchronization signal from the output transmission medium and synchronizes to the peripheral device by sending frames of data with a corresponding synchronization signal to the peripheral device on the input transmission medium.

12. A peripheral device for communication with an audio system, comprising:
one or more processing modules for performing operations with respect to audio data;

an input interface having inputs for receiving signals from an input transmission medium comprising a first communication medium and a second communication medium on which data is received from the audio system as a low voltage differential signal, and from a third communication medium on which a first clock signal is transmitted which corresponds to a transmission rate of bits of the data received on the first and second communication media;

wherein the data received on the first and second communication medium as a low voltage differential signal defines a plurality of frames of input channels of audio and user data in a sequence over time, wherein each frame of the data corresponds to a period of time and comprises a plurality of channels of audio data and a channel of user data and terminated by a synchronization signal with a run length delimiter before each of the plurality of channels and before the synchronization signal, wherein the channel of user data carries requests for status information and control information, wherein each of the plurality of channels of audio data in the frame carries a plurality of bits of a different one of the input channels of audio data for the period of time of the frame, and wherein the synchronization signal comprises a run of zeros greater than a number of bits in each channel;

the input interface processing the first clock signal received over the third communication medium to extract the data received on the first and second communication medium, the extracted data being output to a controller;

the controller having an input receiving, from the input interface, the extracted data and processing digital audio data in the extracted data received from the input interface and directing the received digital audio data from the frame to the one or more processing modules for processing;

an output interface having outputs for connection to an output transmission medium comprising a fourth communication medium and a fifth communication medium, on which data is transmitted to the audio system as a low voltage differential signal, and a sixth communication medium, on which a second clock signal is transmitted which corresponds to a transmission rate of bits of the data transmitted on the fourth and fifth communication media;

wherein the data transmitted on the fourth and fifth communication medium as a low voltage differential signal defines a plurality of frames of output channels of audio and user data in sequence over time, wherein each frame of the data corresponds to a period of time and comprises a plurality of channels of audio data and a channel of user data, terminated by a synchronization signal, with a run length delimiter between the data of each channel and the synchronization signal, wherein the channel of user data carries reply information, wherein each of the plurality of channels of audio data in the frame carries a plurality of bits of a different one of the output channels of audio data for the period of time of the frame, and wherein the synchronization signal comprises a run of zeros greater than a number of bits in each channel;

the controller providing, in response to operations to be performed on input digital audio data in one frame received by the input interface, output digital audio data from the one or more processing modules to the output interface for transmission in a subsequent frame output by the output interface to the audio system over the output transmission medium;

wherein the audio system connects to the peripheral device through the input transmission medium and the output transmission medium, wherein the audio system receives the synchronization signal from the output transmission medium and synchronizes to the peripheral device by sending frames of data with a corresponding synchronization signal to the peripheral device on the input transmission medium.

13. The peripheral device of claim 12, wherein the one or more processing modules comprises a plurality of processing modules connected to the controller by a switch.

14. The peripheral device of claim 13, wherein a state of a switch is controlled using data received in the user data channel over the input transmission medium.

15. A peripheral device for communication with an audio system, comprising:

one or more processing modules for performing operations with respect to audio data;

an input interface having inputs for receiving signals from an input transmission medium comprising a first communication medium and a second communication medium on which data is received from the audio system as a low voltage differential signal, and from a third communication medium on which a first clock signal is transmitted which corresponds to a transmission rate of bits of the data received on the first and second communication media;

wherein the data received on the first and second communication medium as a low voltage differential signal defines a plurality of frames of input channels of audio and user data in a sequence over time, wherein each frame of the data corresponds to a period of time and comprises a plurality of channels of audio data and a channel of user data and terminated by a synchronization signal with a run length delimiter before each of the plurality of channels and before the synchronization signal, wherein the channel of user data carries requests for status information and control information, wherein each of the plurality of channels of audio data in the frame carries a plurality of bits of a different one of the input channels of audio data for the period of time of the frame, and wherein the synchronization signal comprises a run of zeros greater than a number of bits in each channel;

the input interface processing the first clock signal received over the third communication medium to extract the data received on the first and second communication medium, the extracted data being output to a controller;

the controller having an input receiving, from the input interface, the extracted data and processing digital audio data in the extracted data received from the input interface and directing the received digital audio data from the frame to the one or more processing modules for processing according to control information in the one or more registers for storing control information;

an output interface having outputs for connection to an output transmission medium comprising a fourth communication medium and a fifth communication medium, on which data is transmitted to the audio system as a low voltage differential signal, and a sixth communication medium, on which a second clock signal is transmitted which corresponds to a transmission rate of bits of the data transmitted on the fourth and fifth communication media;

wherein the data transmitted on the fourth and fifth communication medium as a low voltage differential signal defines a plurality of frames of output channels of audio and user data in sequence over time, wherein each frame of the data corresponds to a period of time and comprises a plurality of channels of audio data and a channel of user data, terminated by a synchronization signal, with a run length delimiter between the data of each channel and the synchronization signal, wherein the channel of user data carries reply information, wherein each of the plurality of channels of audio data in the frame carries a plurality of bits of a different one of the output channels of audio data for the period of time of the frame, and wherein the synchronization signal comprises a run of zeros greater than a number of bits in each channel the controller providing, in response to operations to be performed on input digital audio data in one frame received by the input interface, output digital audio data from the one or more processing modules to the output interface for transmission in a subsequent frame output by the output interface to the audio system over the output transmission medium;

wherein the one or more processing modules comprises a plurality of processing modules connected to the controller by a switch.

16. The peripheral device of claim 15, wherein a state of a switch is controlled using data received in the user data channel over the input transmission medium.

17. The peripheral device of claim 15, wherein each channel comprises 24 bits, the run length delimiter comprises one bit and the synchronization signal comprises a 29-bit synchronization word comprising 28 consecutive zeros followed by a 1.

18. The peripheral device of claim 17, wherein each frame consists of nine channels and the synchronization word, and wherein the nine channels include a first eight channels of audio data followed by a ninth channel of user data.

19. The peripheral device of claim 18, wherein the ninth channel includes a 16-bit address field in the most significant bits indicating a register in one or more registers of control information and status information and an 8-bit data field in the least significant bits, and wherein the address field includes a read/write control bit in the most significant bit indicating whether the user data represents a read operation on the one or more registers or a write operation on the one or more registers.

20. A peripheral device for communication with an audio system, comprising:
one or more processing modules for performing operations with respect to audio data;
an input interface having inputs for receiving signals from an input transmission medium comprising a first communication medium and a second communication medium on which data is received from the audio system as a low voltage differential signal, and from a third communication medium on which a first clock signal is transmitted which corresponds to a transmission rate of bits of the data received on the first and second communication media;
wherein the data received on the first and second communication medium as a low voltage differential signal defines a plurality of frames of input channels of audio and user data in a sequence over time, wherein each frame of the data corresponds to a period of time and comprises a plurality of channels of audio data and a channel of user data and terminated by a synchronization signal with a run length delimiter before each of the plurality of channels and before the synchronization signal, wherein the channel of user data carries requests for status information and control information, wherein each of the plurality of channels of audio data in the frame carries a plurality of bits of a different one of the input channels of audio data for the period of time of the frame, and wherein the synchronization signal comprises a run of zeros greater than a number of bits in each channel;
the input interface processing the first clock signal received over the third communication medium to extract the data received on the first and second communication medium, the extracted data being output to a controller;
the controller having an input receiving, from the input interface, the extracted data and processing digital audio data in the extracted data received from the input interface and directing the received digital audio data from the frame to the one or more processing modules for processing;
an output interface having outputs for connection to an output transmission medium comprising a fourth communication medium and a fifth communication medium, on which data is transmitted to the audio system as a low voltage differential signal, and a sixth communication medium, on which a second clock signal is transmitted which corresponds to a transmission rate of bits of the data transmitted on the fourth and fifth communication media;
wherein the data transmitted on the fourth and fifth communication medium as a low voltage differential signal defines a plurality of frames of output channels of audio and user data in sequence over time, wherein each frame of the data corresponds to a period of time and comprises a plurality of channels of audio data and a channel of user data, terminated by a synchronization signal, with a run length delimiter between the data of each channel and the synchronization signal, wherein the channel of user data carries reply information, wherein each of the plurality of channels of audio data in the frame carries a plurality of bits of a different one of the output channels of audio data for the period of time of the frame, and wherein the synchronization signal comprises a run of zeros greater than a number of bits in each channel;
the controller providing, in response to operations to be performed on input digital audio data in one frame received by the input interface, output digital audio data from the one or more processing modules to the output interface for transmission in a subsequent frame output by the output interface to the audio system over the output transmission medium;
a clock generation circuit having an output providing the second clock signal for transmission on the sixth communication medium, and wherein the first clock signal received on the third communication medium and the second clock signal have a same first clock rate, wherein the clock generation circuit has a setting controlled by the controller in response to control information provided by the audio system through the input interface to set the first clock rate.

21. The peripheral device of claim 20, wherein the audio system connects to the peripheral device through the input transmission medium and the output transmission medium, wherein the audio system receives the synchronization signal from the output transmission medium and synchronizes to the peripheral device by sending frames of data with a corresponding synchronization signal to the peripheral device on the input transmission medium.

* * * * *